US011907799B2

(12) United States Patent
Handshaw et al.

(10) Patent No.: US 11,907,799 B2
(45) Date of Patent: *Feb. 20, 2024

(54) INDUSTRIAL DIGITAL BARCODE READER

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,089

(22) Filed: Mar. 28, 2022

(65) Prior Publication Data

US 2022/0222455 A1 Jul. 14, 2022

Related U.S. Application Data

(63) Continuation of application No. 16/713,252, filed on Dec. 13, 2019, now Pat. No. 11,288,469.

(51) Int. Cl.
*G06K 7/10* (2006.01)
*G06K 7/14* (2006.01)

(52) U.S. Cl.
CPC ....... *G06K 7/10554* (2013.01); *G06K 7/1413* (2013.01)

(58) Field of Classification Search
CPC .................................. G06K 7/10; G06K 7/14
See application file for complete search history.

(56) References Cited

U.S. PATENT DOCUMENTS

| 4,288,690 A | 9/1981 | Sanner |
| 5,019,694 A * | 5/1991 | Collins, Jr. ........ G06K 7/10871 |
| | | 235/462.14 |

(Continued)

FOREIGN PATENT DOCUMENTS

EP  1310903 A1  5/2003

OTHER PUBLICATIONS

Novelty Search Report for Belgian Patent Application No. 2020/5907 dated Sep. 7, 2021.

(Continued)

*Primary Examiner* — Thien M Le
(74) *Attorney, Agent, or Firm* — Yuri Astvatsaturov

(57) ABSTRACT

A convertible slot scanner assembly for capturing at least one object appearing in a field of view (FOV) is provided that includes an imaging assembly, a controller, an image decoder, a chassis, a first window, and a housing. The chassis is configured to accommodate the imaging assembly and includes an optical cavity, an opening, and a flange portion at least partially surrounding the opening. The first window is configured to at least partially cover the opening of the chassis. The housing includes a housing cavity that is dimensioned to at least partially accommodate the chassis. The housing is positionable in a first, horizontal configuration and a second, vertical configuration. In the horizontal configuration, the first window is in a generally horizontal orientation. In the vertical configuration, the first window is in a generally upright orientation.

36 Claims, 9 Drawing Sheets

(56) References Cited

U.S. PATENT DOCUMENTS

| | | | | |
|---|---|---|---|---|
| 5,478,998 | A * | 12/1995 | Charych | G06K 7/10861 |
| | | | | 235/462.43 |
| 5,691,528 | A | 11/1997 | Wyatt et al. | |
| 5,888,087 | A * | 3/1999 | Hanson | G06F 1/3203 |
| | | | | 439/297 |
| 5,975,417 | A | 11/1999 | Spencer et al. | |
| 6,435,407 | B1 | 8/2002 | Fiordelisi | |
| 6,595,422 | B1 * | 7/2003 | Doljack | G06K 7/10722 |
| | | | | 235/462.43 |
| 7,623,224 | B2 * | 11/2009 | Vogel | G01C 25/00 |
| | | | | 356/141.5 |
| 9,268,979 | B2 | 2/2016 | Thompson et al. | |
| 2002/0148901 | A1 * | 10/2002 | Barkan | G06K 7/10653 |
| | | | | 235/462.43 |
| 2003/0020132 | A1 | 1/2003 | Cornett | |
| 2003/0201329 | A1 | 10/2003 | Kumagai et al. | |
| 2004/0042681 | A1 | 3/2004 | Takano et al. | |
| 2010/0155483 | A1 * | 6/2010 | Craig | G06K 7/109 |
| | | | | 235/462.43 |
| 2012/0049049 | A1 | 3/2012 | Vinogradov et al. | |
| 2013/0193208 | A1 | 8/2013 | Collins et al. | |
| 2014/0081874 | A1 * | 3/2014 | Lewis | G07F 19/202 |
| | | | | 705/72 |
| 2015/0220765 | A1 * | 8/2015 | Carnevali | G06K 7/10881 |
| | | | | 235/462.45 |
| 2015/0242444 | A1 * | 8/2015 | Campbell | H04N 1/444 |
| | | | | 382/218 |
| 2019/0171854 | A1 * | 6/2019 | Vonmetz | G06K 7/1413 |
| 2021/0182514 | A1 | 6/2021 | Handshaw et al. | |

OTHER PUBLICATIONS

Combined Search Report and Examination Report for Great Britain Application No. 2019442.9 dated Jun. 9, 2021.

* cited by examiner

INDUSTRIAL DIGITAL BARCODE READER

CROSS-REFERENCE TO RELATED APPLICATION

This application is a continuation of U.S. patent application Ser. No. 16/713,252, filed on Dec. 13, 2019, and incorporated herein by reference in its entirety.

BACKGROUND OF THE INVENTION

Barcode and other scanning devices generally capture images within a given field of view (FOV). Barcode readers may be provided to be used in a various orientations depending on environments. For example, some barcode readers may be implemented in a generally vertical orientation to be used in countertops, kiosks, and other vertical scanning environments, and may also be used in a generally horizontal orientation to be used in table or platter environments. Typically, horizontal and vertical barcode readers have different design requirements due to differing fields of view. More specifically, in vertical orientations, the FOV is typically parallel to the tabletop (i.e., perpendicular to the front face of the barcode reader). Conversely, in the horizontal orientation, the FOV is tilted in order to scan barcodes on packages in differing orientations.

Accordingly, there is a need for improved accessories having improved functionalities.

SUMMARY

According to a first aspect, a convertible slot scanner assembly for capturing at least one object appearing in a field of view (FOV) is provided that includes an imaging assembly, a controller, an image decoder, a chassis, a first window, and a housing. The chassis is configured to accommodate the imaging assembly and includes an optical cavity, an opening, and a flange portion at least partially surrounding the opening. The first window is configured to at least partially cover the opening of the chassis. The housing includes a housing cavity that is dimensioned to at least partially accommodate the chassis. The housing is positionable in a first, horizontal configuration and a second, vertical configuration. In the horizontal configuration, the first window is in a generally horizontal orientation. In the vertical configuration, the first window is in a generally upright orientation.

In some examples, the convertible slot scanner may further include a first adapter configured to be coupled with the chassis when the housing is positioned in the horizontal configuration. The first adapter may be in the form of a platter including a platter opening and a second window configured to at least partially cover the platter opening. In some of these examples, the first adapter may additionally include a tub. The tub is configured to engage at least one of the housing or the flange portion of the chassis. The platter is configured to engage at least one of the tub or the flange portion of the chassis.

In some examples, the convertible slot scanner assembly may include a second adapter. The second adapter may be coupled with the chassis when the housing is positioned in the vertical configuration. The second adapter may include an outer bezel configured to engage at least one of the housing or the flange portion of the chassis. The outer bezel may protrude outwardly from the first window to form a recessed region.

In some forms, the convertible slot scanner assembly includes at least one interface element. The at least one interface element may include at least one of at least one button, an illumination member, or a sound generating device. The at least one interface may be at least one of physically engagable, viewable, or audible from an outwardly facing side of the housing. In examples where the at least one interface element is in the form of a sound generating device, the flange portion of the chassis may further include at least one sound port. In examples where the interface element is in the form of at least one button, the button is engagable through the flange portion of the chassis. In examples where the interface element is in the form of the illumination member, the illumination member is viewable through the first window.

In some examples, the first window sealingly engages the optical cavity. In some examples, the flange portion of the chassis may include at least one mounting mechanism. Further, in some examples, the chassis may include a mirror support member. The mirror support member may include a plurality of support surfaces to accommodate a mirror in a plurality of positions.

In some examples, the chassis may further include an illumination cavity positioned a distance from the optical cavity. In some examples, the FOV may be arranged non-perpendicularly relative to the first window.

In accordance with a second embodiment, a convertible slot scanner assembly for capturing at least one object appearing in a field of view (FOV) is provided that includes an imaging assembly, a controller, an image decoder, a chassis, a first window, a housing, a first adapter, and a second adapter. The chassis is configured to accommodate the imaging assembly and includes an optical cavity, an opening, and a flange portion at least partially surrounding the opening. The first window is configured to at least partially cover the opening of the chassis. The housing includes a housing cavity that is dimensioned to at least partially accommodate the chassis. The housing is positionable in a first, horizontal configuration and a second, vertical configuration. In the horizontal configuration, the first window is in a generally horizontal orientation. In the vertical configuration, the first window is in a generally upright orientation. The first adapter is configured to be coupled with the chassis when the housing is positioned in the horizontal configuration. The second adapter is configured to be coupled with the chassis when the housing is positioned in the upright position.

In these examples, the first adapter may be in the form of a platter including a platter opening and a second window configured to at least partially cover the platter opening. In some of these examples, the first adapter may additionally include a tub. The tub is configured to engage at least one of the housing or the flange portion of the chassis. The platter is configured to engage at least one of the tub or the flange portion of the chassis. Further, the second adapter may be coupled with the chassis when the housing is positioned in the vertical configuration. The second adapter may include an outer bezel configured to engage at least one of the housing or the flange portion of the chassis. The outer bezel may protrude outwardly from the first window to form a recessed region.

In some forms, the convertible slot scanner assembly includes at least one interface element. The at least one interface element may include at least one of at least one button, an illumination member, or a sound generating device. The at least one interface may be at least one of physically engagable, viewable, or audible from an outwardly facing side of the housing. In examples where the at least one interface element is in the form of a sound generating device, the flange portion of the chassis may further include at least one sound port. In examples where the interface element is in the form of at least one button, the button is engagable through the flange portion of the chassis. In examples where the interface element is in the form of the illumination member, the illumination member is viewable through the first window.

In some examples, the first window sealingly engages the optical cavity. In some examples, the flange portion of the chassis may include at least one mounting mechanism. Further, in some examples, the chassis may include a mirror support member. The mirror support member may include a plurality of support surfaces to accommodate a mirror in a plurality of positions.

In some examples, the chassis may further include an illumination cavity positioned a distance from the optical cavity. In some examples, the FOV may be arranged non-perpendicularly relative to the first window.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
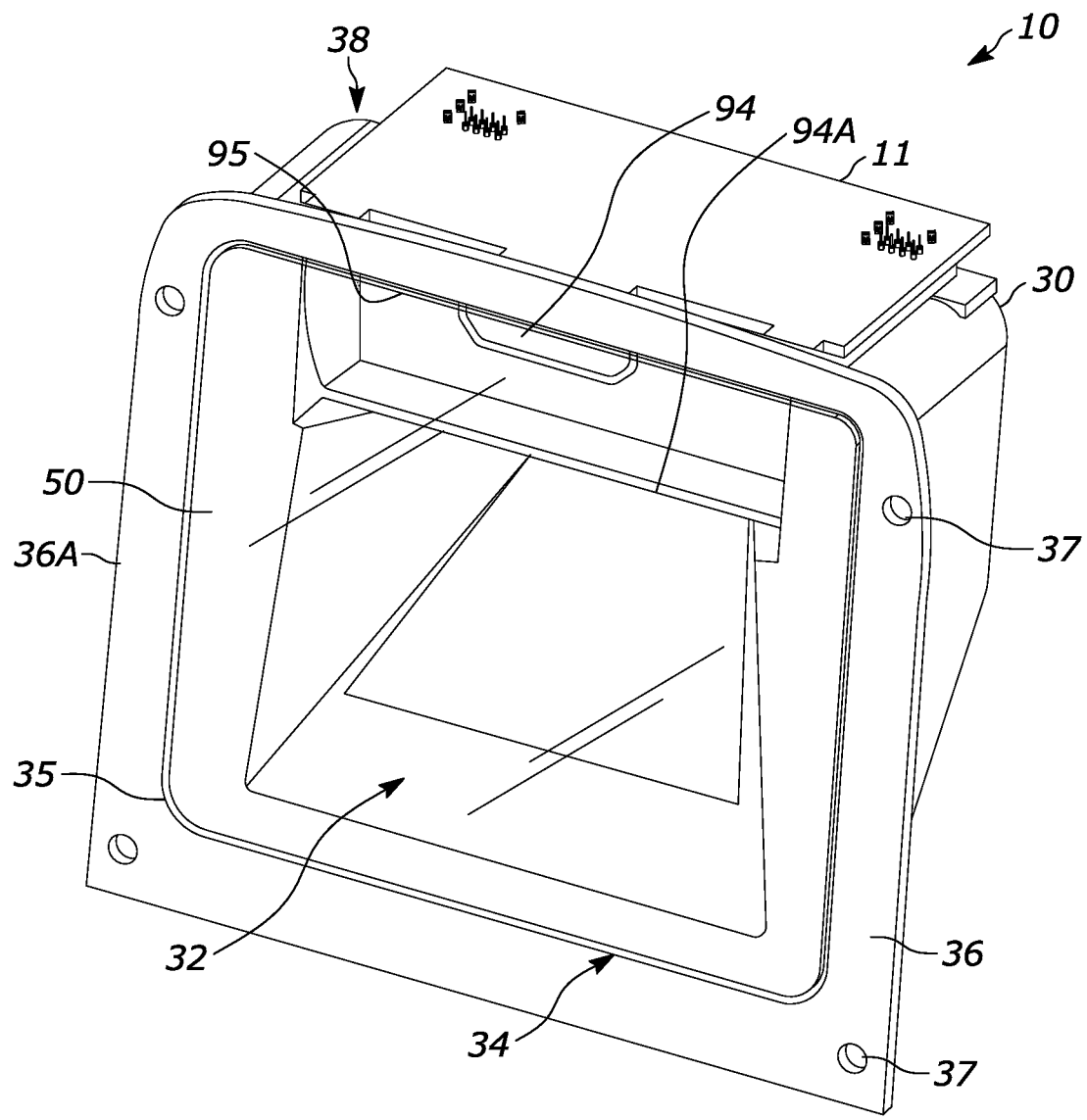
FIG. 1 is a front perspective view of an industrial digital barcode reader assembly in accordance with this disclosure.
Figure 2:
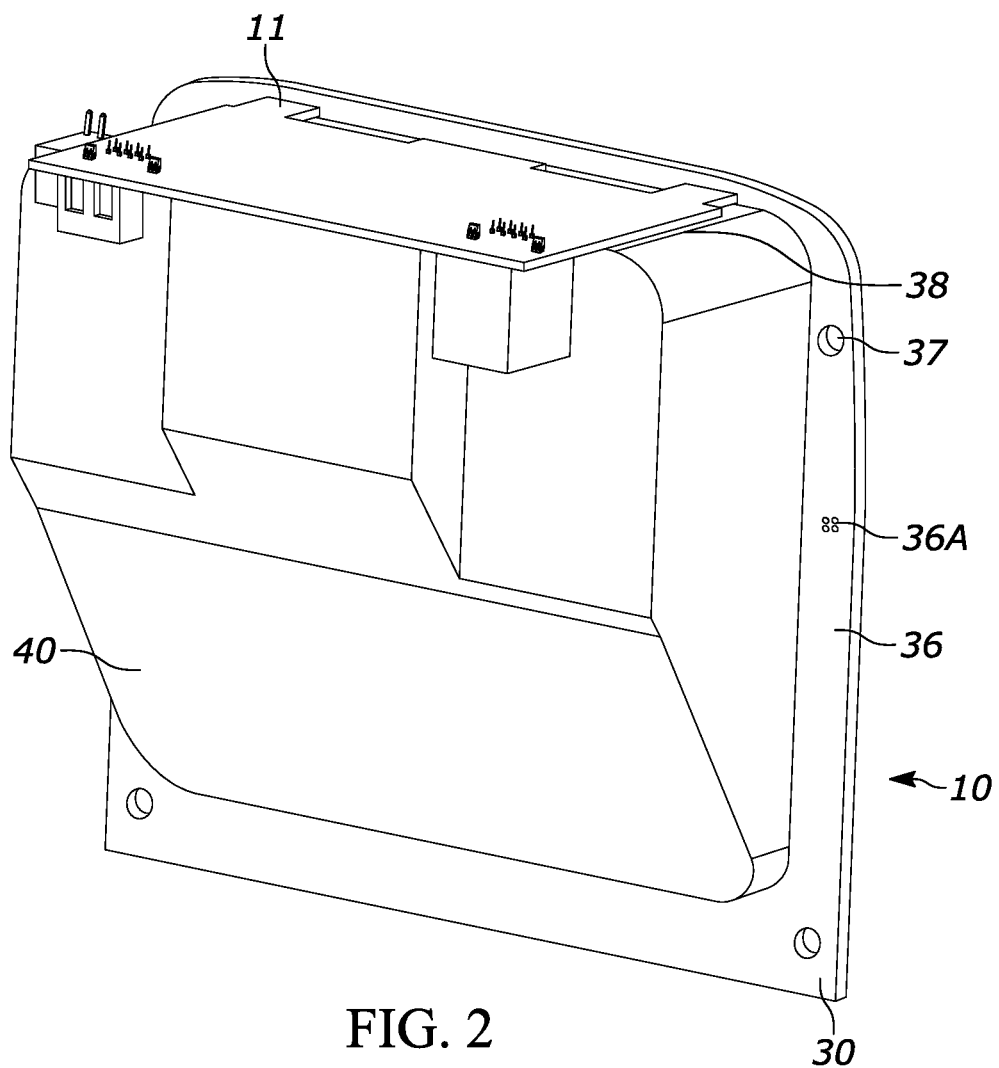
FIG. 2 is a rear perspective view of the industrial digital barcode reader assembly of FIG. 1 in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, reference numeral 10 generally identifies a convertible slot scanner assembly for capturing at least one image of an object appearing in a field of view (FOV). The convertible slot scanner assembly 10 includes a circuit board 11, an imaging assembly 12, a controller 16, an image decoder 20, a chassis 30, a first window 50, and a housing 60.

The chassis 30 is configured to accommodate all of the opto-mechanics such as the imaging assembly 12, the controller 16, and the image decoder 20, and includes an optical cavity 32, an opening 34, a flange 36 that at least partially surrounds the opening 34, and a mirror support surface 40. The flange 36 may act as a seal to seal the entire perimeter of the housing 60. The system 10 may include a seal member such as a gasket (not illustrated) to further seal the housing 60 and to create a dust seal and/or an electrostatic discharge seal. The chassis 30 may be constructed from any number of suitable materials such as, for example, metals and/or polymers. Notably, by using the chassis 30 to mount the opto-mechanics separately from the housing 60, the assembly 10 may be used in kiosk applications where the assembly 10 does not need the additional housing, thereby reducing costs.

In the illustrated example, the opening 34 further defines a supporting ledge or recess 35. Further, the flange 36 may include any number of mounting features 37 (e.g., holes) to accommodate mounting of the chassis 30 as will be described in further detail below.

The optical cavity 32 is a generally hollow region that allows light to pass through to the imaging assembly 12. The chassis 30 includes a mounting portion 38 (e.g., a generally flat surface) that accommodates the circuit board 11 by securing the circuit board 11 thereto via any number of suitable approaches. The imaging assembly 12, the controller 16, and the image decoder 20 may all be operably coupled with the circuit board 11 via any number of suitable approaches. The imaging assembly 12 is configured to capture an image frame appearing in a FOV and can include any number of image sensors 14. The image sensor 14 has a plurality of photosensitive elements. The decoder 20 is communicatively coupled with the imaging assembly 12 and is configured to decode a barcode captured in an image by the imaging assembly 12. In some examples, only the imaging assembly 12 is communicatively coupled to the decoder 20 and is used to process images for decoding indicia.

Figure 12:
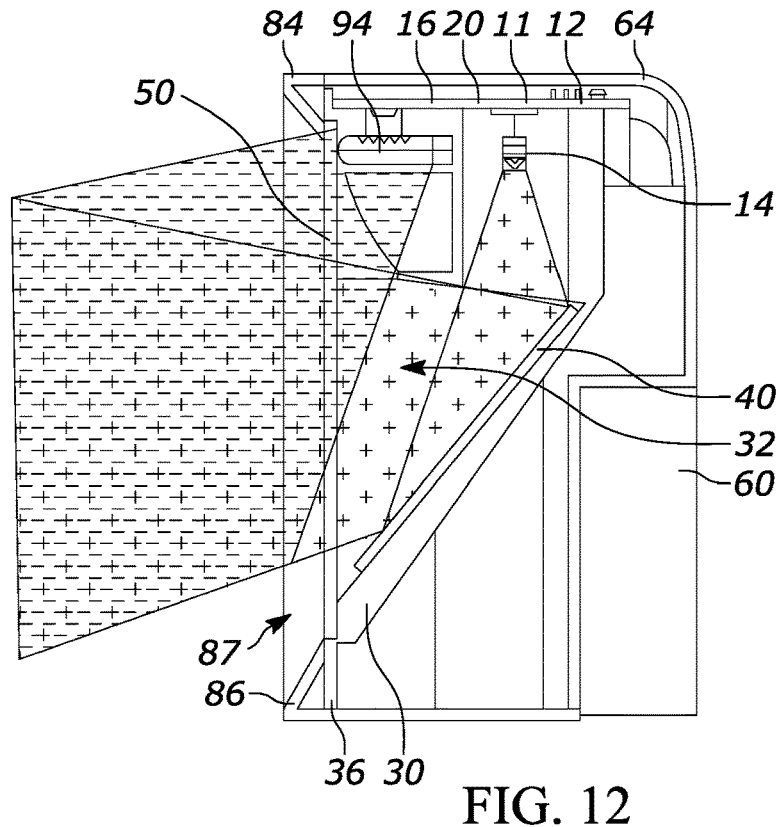
FIG. 12 is a side elevation cross sectional view of an alternative industrial digital barcode reader assembly in a vertical orientation in accordance with this disclosure.
Figure 13:
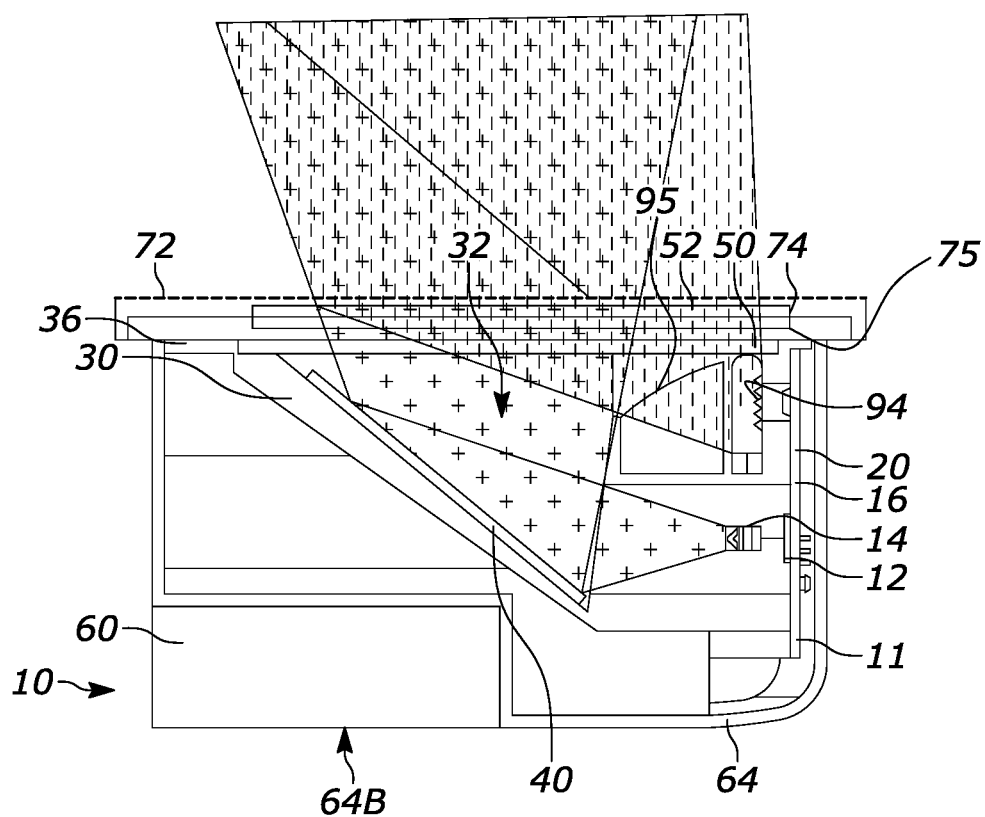
FIG. 13 is a side elevation cross sectional view of the alternative industrial digital barcode reader assembly of FIG. 12 in a horizontal orientation in accordance with this disclosure.
Figure 14:
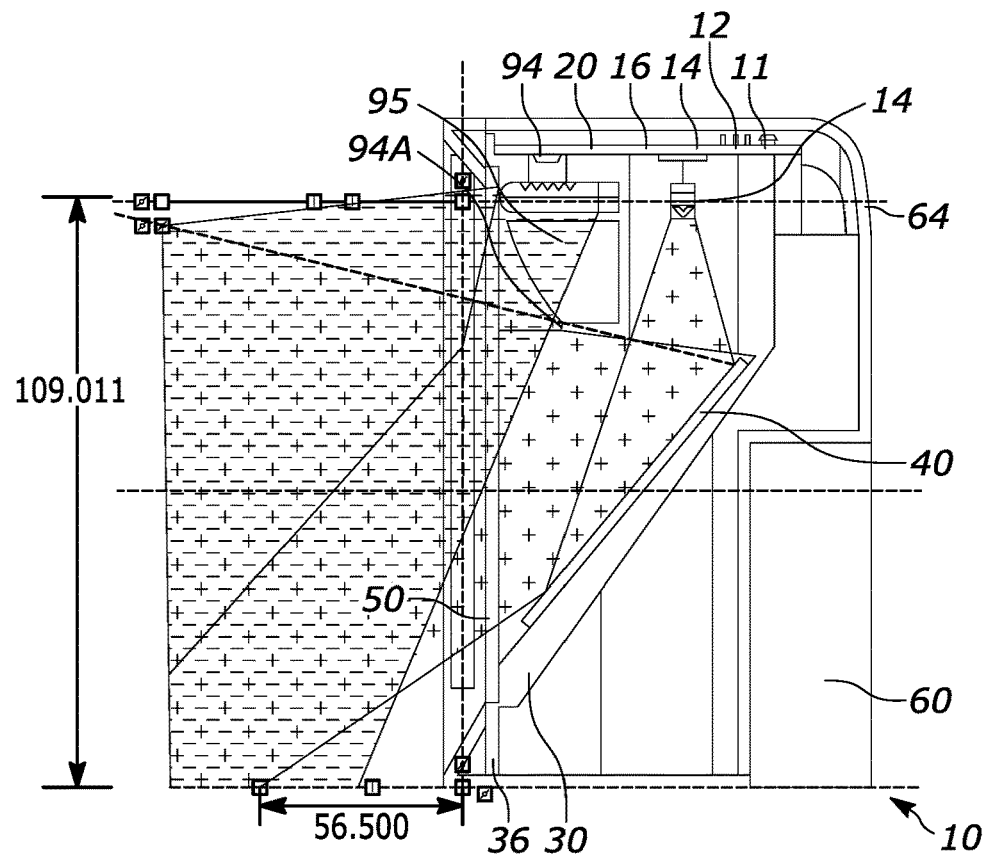
FIG. 14 is a side elevation cross sectional view of the alternative industrial digital barcode reader assembly of FIGS. 12 and 13 in accordance with this disclosure.

With reference to FIGS. 12-14, the FOV is arranged in a downwardly-tilted orientation. Such an orientation enables the horizontal scanner to capture vertical barcodes that are swiped by it from the leading side of the scanner. Slightly tilting the FOV allows for a tall enough FOV for the vertical scanner to still read barcodes that are high up on items that are swiped by. In these examples, an approximately 57°×36° FOV size using a 1920×1200 (2MP) sensor, and an approximately 3.92" internal path length serves to achieve the desired resolution. This FOV results in an approximately 2.7" tall×4" wide at the front of the scanner.

A FOV tilt of approximately 14° downward is adequate to read as little as approximately 9 mil at approximately 3" for a perpendicular barcode, approximately 6.9 mil at approximately 3" when the code is tilted slightly (e.g., 10°) towards the scanner, approximately 6.7 mil at approximately 1" for a perpendicular barcode and approximately 5 mil at approximately 1" when the barcode is tilted slightly toward the scanner (e.g., approximately 10°). This ensures that the horizontal slot scanner can adequately read approximately 40% UPC barcodes that are standing near vertically from approximately 0-1" and still have a tall enough FOV for the vertical slot scanner (approximately 4.3" from the counter at approximately 5" from the face of the scanner), so that it can compete well with the competition and perform even better on perpendicular codes.

In these examples, the off-axis illumination system 94 also has full coverage at the face of the scanner up to approximately 5" from the face, with a baffle 94a in between the two systems to prevent internal reflections. The center axis of the illumination system 94 is tilted forward by approximately 38° and can provide approximately 62° of vertical coverage to achieve full FOV coverage between the nose and approximately 5".

In other approaches, the same FOV and folded mirror path may be used for both vertical and horizontal configurations. For example, the image sensor 14 may generate a 48°×36° FOV size using a 1280×960 sensor, and approximately a 3.85" internal path length may be used to achieve resolution requirements. This FOV may result in a 2.5" tall×3.5" wide area at the front of the scanner assembly 10.

The window 50 is generally supported by the chassis 30 and is configured to allow light to pass between a product-scanning region and the cavity 32 of the chassis 30. More specifically, in the illustrated example, the window 50 is configured to be positioned on the ledge or recess 35 of the chassis 30. In other examples, the window 50 may simply be configured to at least partially cover the opening 34 of the chassis 30 via any number of suitable approaches. In the illustrated examples, the window 50 is configured to be generally flush with the flange 36 when disposed within (or covering) the opening 34 of the chassis 30. Accordingly, the assembly 10 may be used in kiosk applications that do not include a recessed window what may accumulate debris.

Figure 3:
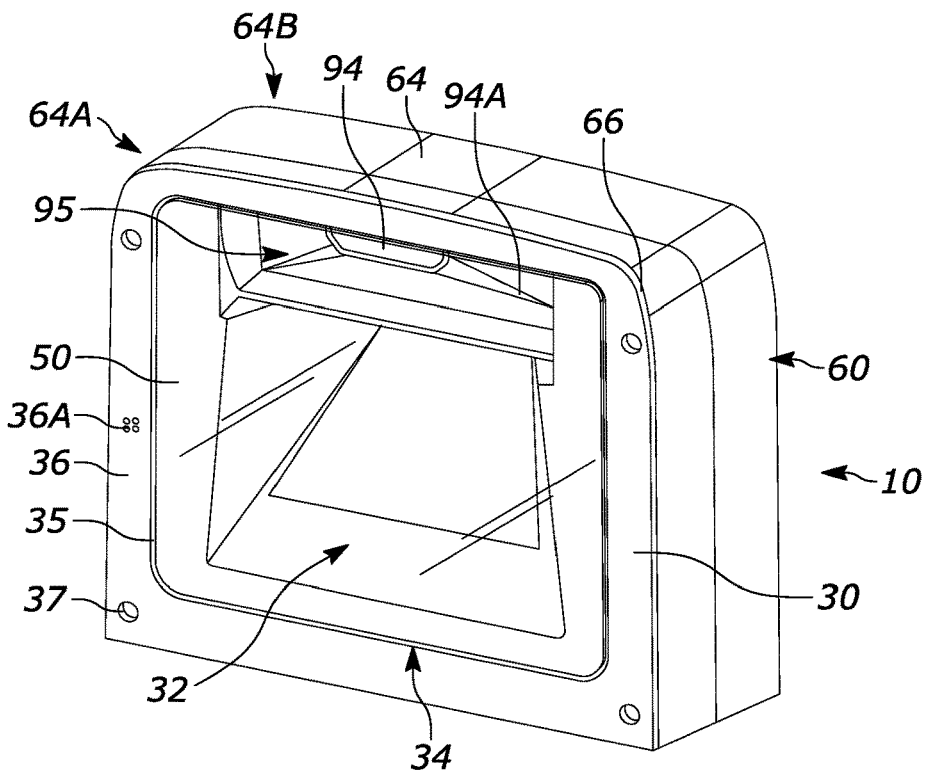
FIG. 3 is a front perspective view of the industrial digital barcode reader assembly of FIGS. 1 and 2 coupled with a housing in accordance with this disclosure.

With reference to FIG. 3, the housing 60 may include a housing cavity dimensioned to at least partially accommodate the chassis 30. The housing may be approximately 5.4" tall by approximately 6.0" wide. The housing 60 further includes an exterior surface 64 that, in some examples, may have a generally tapered profile when viewed from the first end 64a to the second end 64b thereof. As illustrated in FIG. 3, the first end 64a of the housing includes a lip 66 that may be generally flush with the flange 36 and the window 50 when the chassis 30 is disposed therein.

The housing 60 is positionable in a first, horizontal configuration (FIGS. 4-6) where the first window 50 is in a generally horizontal orientation and a second, vertical configuration (FIGS. 7-9) where the first window 50 is in a generally vertical orientation. More specifically, the housing 60 may be operably coupled with first and second adapters 70, 84, respectively, for selectively positioning the slot scanner assembly 10 in horizontal and vertical configurations. In horizontal configurations, the slot scanner assembly 10 may be disposed within a countertop where the scanner assembly 10 may be a part of a conveyor or similar checkout environment. In vertical configurations, the slot scanner assembly 10 may be used in kiosks, or countertop environments.

Figure 4:
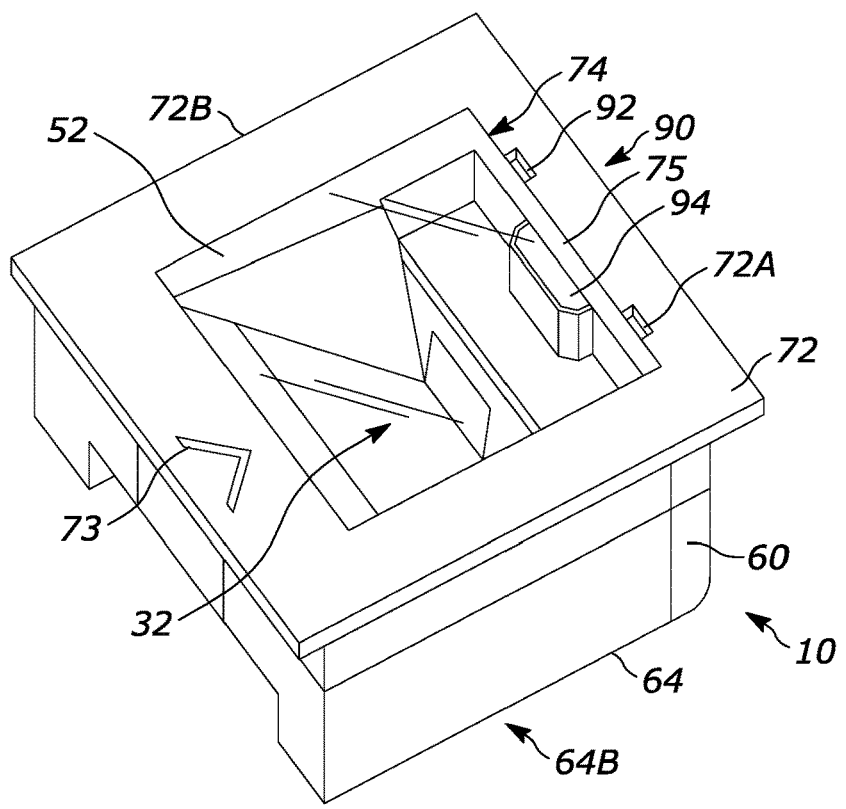
FIG. 4 is a front perspective view of the industrial digital barcode reader assembly of FIGS. 1-3 coupled with a first adapter in accordance with this disclosure.
Figure 5:
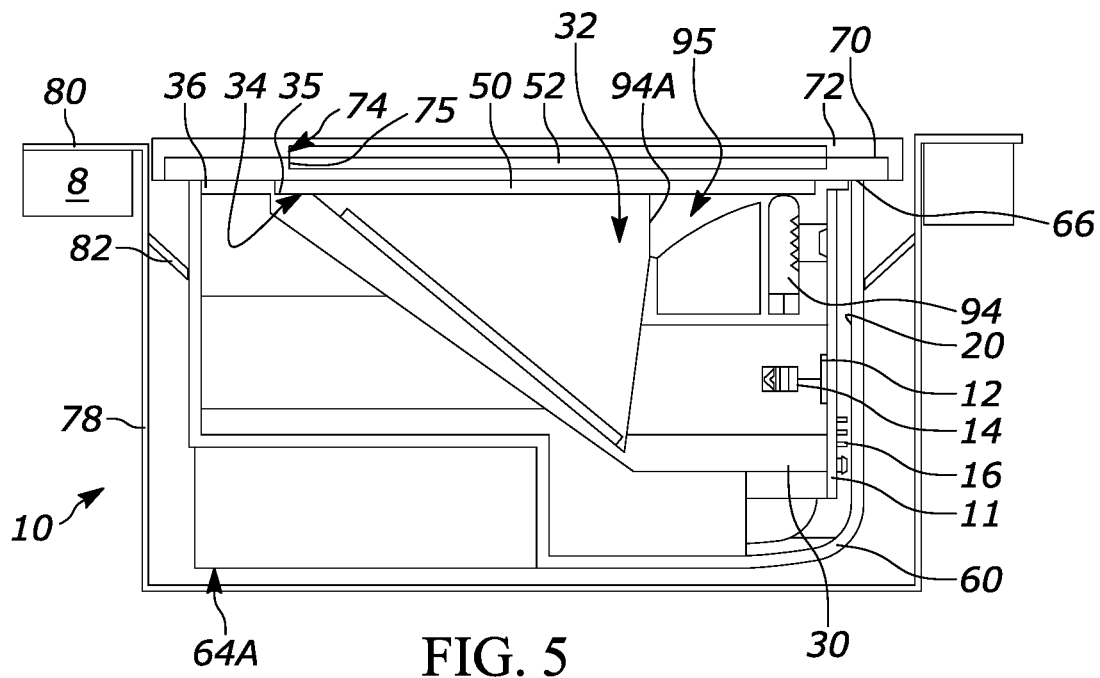
FIG. 5 is a side elevation cross sectional view of the industrial digital barcode reader assembly of FIGS. 1-4 coupled with the first adapter in accordance with this disclosure.
Figure 6:
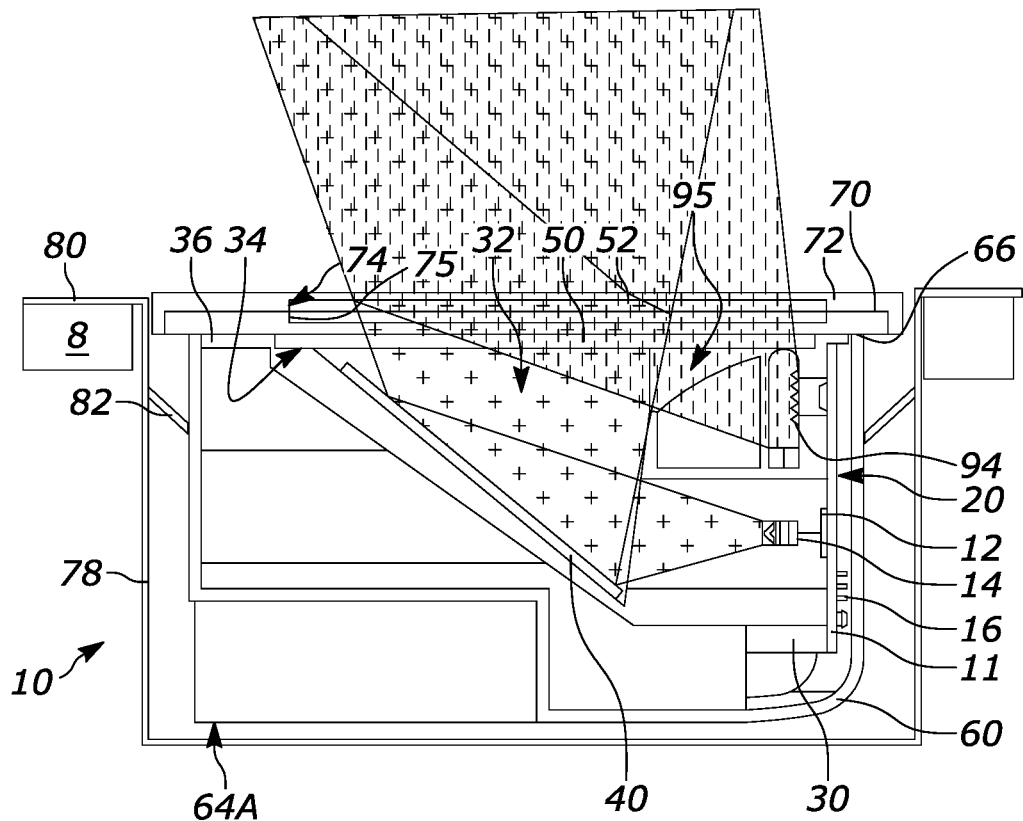
FIG. 6 is a side elevation cross sectional view of the industrial digital barcode reader assembly of FIGS. 1-5 illustrating the FOV in accordance with this disclosure.

Turning to FIGS. 4-6, the first adapter 70 is used to position the slot scanner assembly 10 in the horizontal configuration, and includes a platter 72 including a platter opening 74 and a second window 52. In some examples, the first adapter 70 may additionally include a tub 78. As with the chassis 30, the platter opening 74 further defines a supporting ledge or recess 75. The platter 72 may be supported by the housing 60 (e.g., the lip 66), the flange 36 of the chassis 30, and/or the tub 78. In some examples, the platter 72 may simply rest on top of the housing 60, and in other examples, the platter 72 may be operably coupled therewith. In any of these examples, the platter 72 may be removable from the assembly 10 for cleaning and/or inspection purposes while the housing 60 may be retained in the horizontal position. In some examples, the platter 72 may be keyed so that it senses coupling with the assembly 10.

The second window 52 is generally supported by the platter 72 and is configured to allow light to pass from the product-scanning region, the second window 52, the first window 50, and into the cavity 32 of the chassis 30. The second window 52 may be constructed from a harder material than the first window 50 such as, for example, sapphire and/or a glass having a diamond like carbon coating capable of resisting scratching or scuffing damage when items (e.g., products) are slid thereacross during the item scanning process. In some examples, the second window 52 may have a smaller area than the first window 50. More specifically, the first window 50 may have a larger area to support a larger field of view for the vertical and kiosk embodiments, whereas the second window 52 may have a smaller area that clips or reduces the size of the FOV because the harder materials such as sapphire may be more costly, and such a reduced area may lower costs.

In the illustrated example, the second window 52 is configured to be positioned on the ledge or recess 75 of the platter 72. In other examples, the second window 52 may be configured to at least partially cover the opening 74 of the platter 72 via any number of suitable approaches. In the illustrated examples, the second window 52 is configured to be generally flush with the platter 72 when disposed within (or covering) the opening 74 of the platter 72. Accordingly, items desired to be scanned may slide across these surfaces without being bumped or otherwise jostled. The platter 72 may further include a directional indicator 73 to provide a user with a visual indication of the scan direction.

In some examples, the tub 78 has a tub cavity dimensioned to at least partially accommodate the housing 60. In the illustrated example, the tub 78 includes a flange 80 that rests on the counter 8. Accordingly, the counter 8 is configured to support the weight of the tub 78 as well as any components disposed therein. The tub 78 may further include any number of centering arms 82 that extend into the tub cavity. The tub 78 may be dimensioned to fit in standard 6"×6" counter openings for horizontal mini slot scanners. The centering arms 82 may be used to center the housing 60 within the tub cavity due to the smaller size of the housing (e.g., approximately 5.4"×6"). Accordingly, the centering arms 82 may be used to retain smaller scan assemblies. In some examples, the centering arms 82 may be constructed from a resilient and/or a flexible material to allow differing housings to be disposed within the tub cavity. Other examples are possible. In other examples, the tub 78 may be configured to engage and couple with the flange 36 of the chassis 30.

Figure 7:
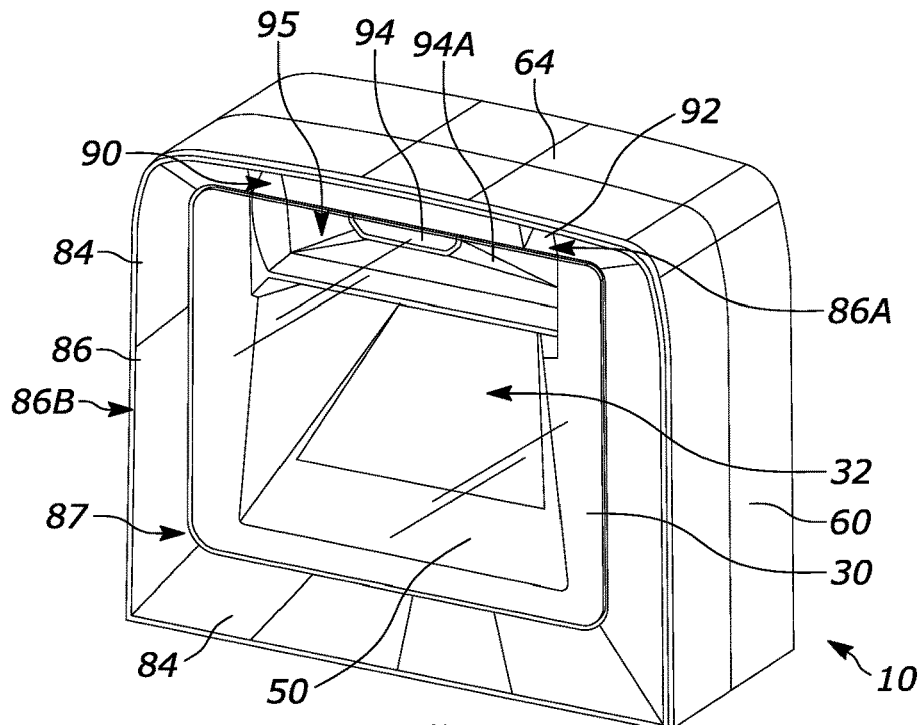
FIG. 7 is a front perspective view of the industrial digital barcode reader assembly of FIGS. 1-3 coupled with a second adapter in accordance with this disclosure.
Figure 8:
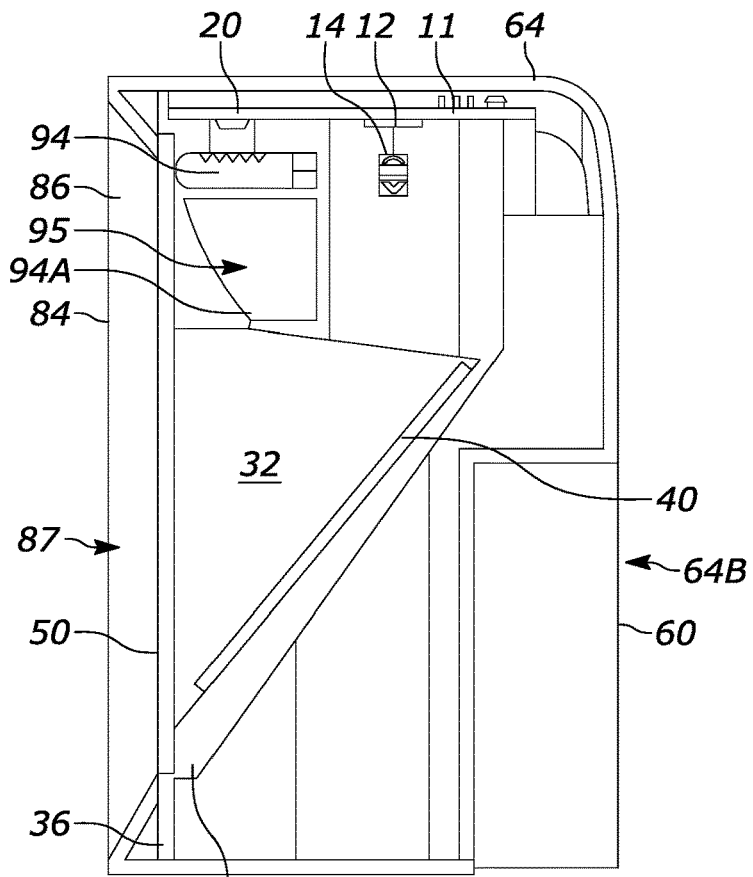
FIG. 8 is a side elevation cross sectional view of the industrial digital barcode reader assembly of FIG. 7 in accordance with this disclosure.
Figure 9:
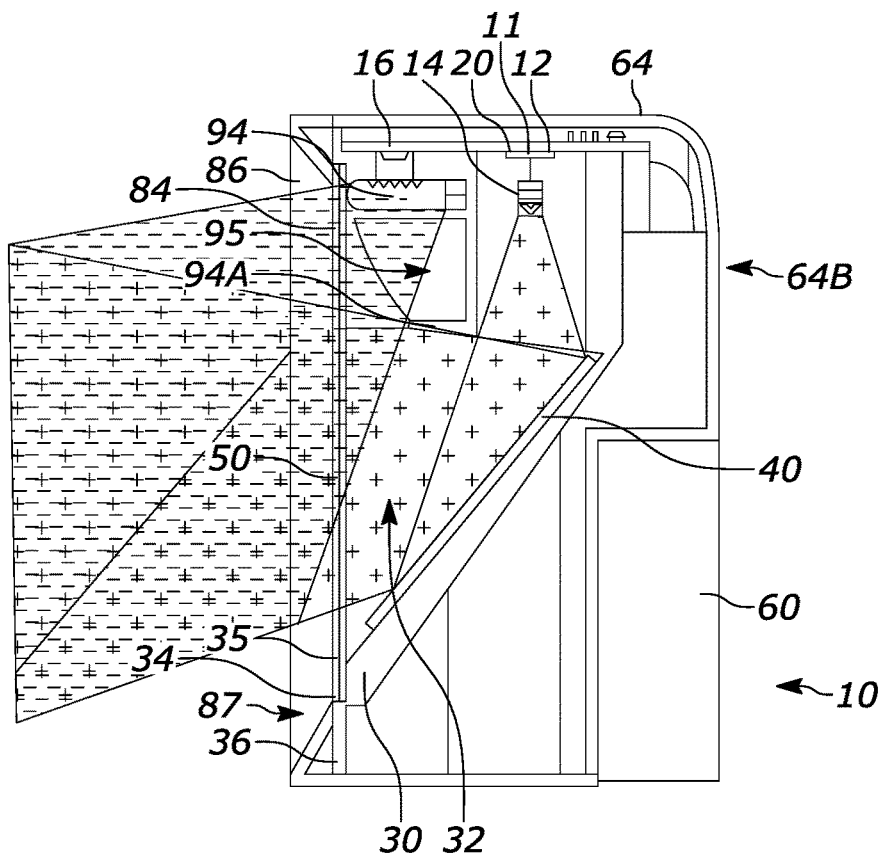
FIG. 9 is a side elevation cross sectional view of the industrial digital barcode reader assembly of FIGS. 7 and 8 illustrating the FOV in accordance with this disclosure.

Turning to FIGS. 7-9, the second adapter 84 is used to position the slot scanner assembly 10 in the vertical configuration, and includes an outer bezel 86 or ring member. The outer bezel 86 is configured to engage at least one of the housing 60 or the flange 36 of the chassis 30. In some examples, the outer bezel 86 may include prongs (not illustrated) that are insertable into the mounting features 37 formed on the flange 36 of the chassis 30. As a result, in the illustrated example, the outer bezel 86 may be snapped onto the chassis 30 and may retain the first window 50, and can protrude outwardly from the first window 50 to form a recessed region 87.

As previously noted, the scanner assembly 10 may also be used in kiosk environments. By removing the outer bezel 86 and/or the housing 60, the mounting features 37 may be used to secure to a kiosk housing (not illustrated). In these examples, the first window 50 may be generally parallel with the kiosk housing to provide a wide FOV. By removing these components, the assembly 10 is less expensive and will occupy less space within the kiosk.

So configured, the scanner assembly 10 may be easily convertible to be used in horizontal or vertical environments. With reference to FIGS. 6 and 9, the same FOV and folded mirror path may be used for both vertical and horizontal configurations. For example, the image sensor 14 may generate an approximately 48°×36° FOV size using a 1280×960 sensor, and approximately a 3.85" internal path length may be used to achieve resolution requirements. This FOV may result in an approximately 2.5" tall×3.5" wide area at the front of the scanner assembly 10.

The scanner assembly 10 may include any number of additional components to assist in operation thereof. For example, the scanner assembly 10 may include any number of interface elements 90 that a user may interact with. The interface element 90 may be in the form of a button or buttons 92, an illumination member or members 94, a sound generating device 96 (e.g., a speaker or a beeper), and the like. Other examples are possible. Generally speaking, the interface elements 90 may be positioned at or near the flange 36 and/or a portion of the housing 60.

Figure 15:
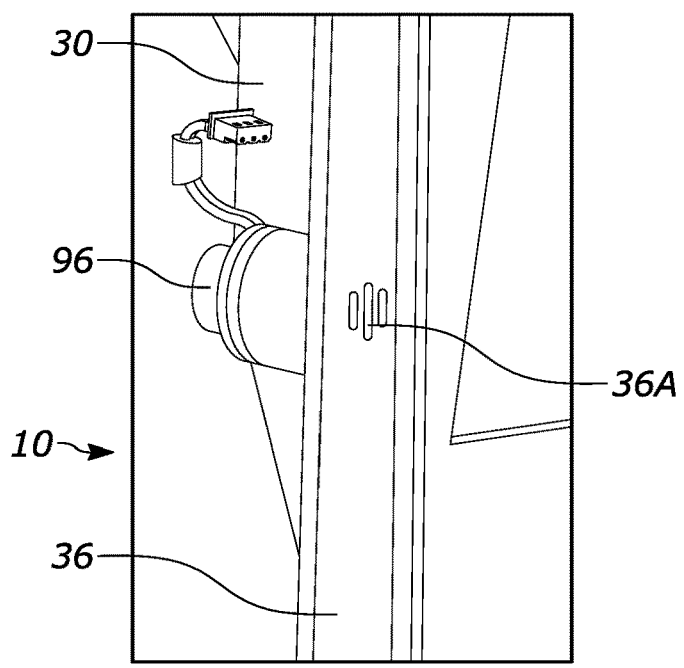
FIG. 15 is a close-up perspective view of a portion of the chassis of the industrial digital barcode reader assemblies of FIGS. 1-14 in accordance with this disclosure.

More specifically, with reference to FIGS. 4, 7, and 15, the interface elements 90 may be engagable, viewable, or audible from an outwardly facing side of the housing. For example, the button or buttons 92 may be positioned along the flange 36 of the chassis 30 and may be physically engagable through the first adapter 70 and the second adapter 84. The buttons 92 may be in the form of physical buttons or capacitive buttons. In examples using physical buttons, the first and second adapters 70, 84, and more specifically the platter 72 and the outer bezel 86, may include openings 72a, 86a through which the button or buttons 92 may protrude to be engaged by a user. In examples using capacitive buttons, the first and the second adapters 70, 84 may include an indicator (not illustrated) for where the user should press to engage the button 92. In some horizontal implementations, it may be desired to position the buttons 92 under the platter 72 to prevent a user from inadvertently pressing the button 92. Accordingly, the platter 72 may include a hollow cavity to accommodate any such button 92.

The illumination member 94 may be in the form of an indicator lightpipe. The indicator lightpipe 94 may be positioned near and operably coupled with the circuit board 11 and may be illuminated through the opening 34 of the chassis 30. In these examples, the indicator lightpipe 94 may be viewable through the first window 52 and the second window 52 when the scanner assembly 10 is used in the horizontal configuration.

The sound generating device 96 may be positioned near and operably coupled with the circuit board 11 and may be disposed on the flange 36 of the chassis 30. As illustrated in FIG. 15, the flange 36 may include any number of speaker ports 36a to allow sound to travel through the flange 36. Similarly, the platter 72 and the outer bezel 86 may include openings 72b, 86b that allow the sound emitted from the sound generating device 96 to pass therethrough.

Figure 10:
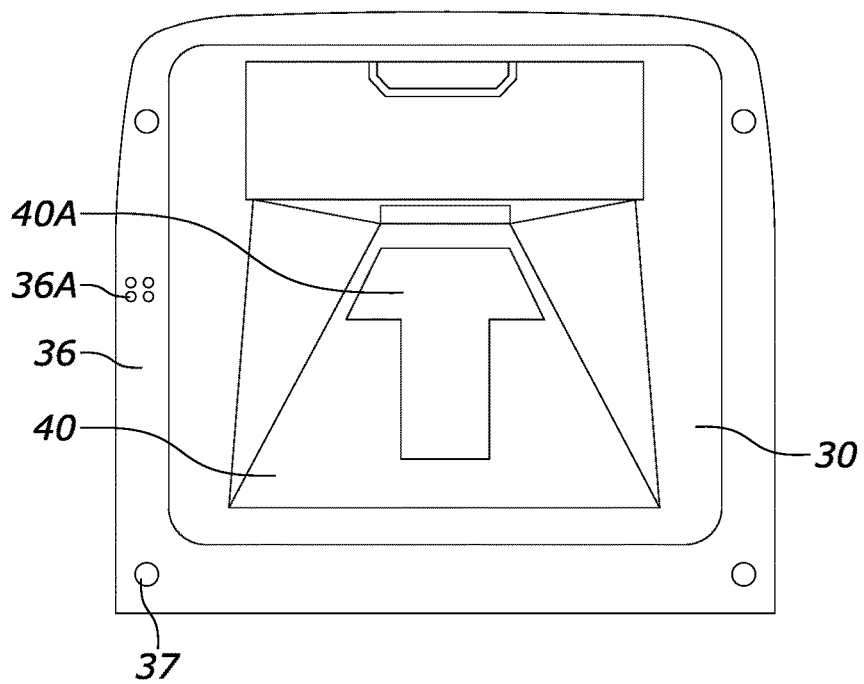
FIG. 10 is a front elevation view of a portion of the industrial digital barcode reader assembly of FIGS. 1-9 in accordance with this disclosure.

With reference to FIG. 10, in some examples, it may be desired to have different FOVs for the imaging systems for horizontal and vertical units. In such examples, the chassis 30 may be made to accept differing mirror angles. For example, it may be desired to have a FOV in horizontal environments that is tilted further to better scan perpendicular codes that are swiped across the platter 72. In such examples, the chassis 30 may include an additional mounting surface 40a recessed into the mirror support surface 40 at the alternate angle. In these examples, the mirror may be attached to the additional mounting surface 40a via any number of suitable approaches such as, for example, a pad using double-sided tape to avoid interfering with the mounting surface 40. In other examples, the chassis 30 may support a mirror holder (not illustrated) on a pivotable member (not illustrated). The mirror holder may be movable to a desired position by the user by engaging a switch or a knob for adjustment. In other examples, a separate chassis (not illustrated) may be used that incorporates a different FOV angle.

Figure 11:
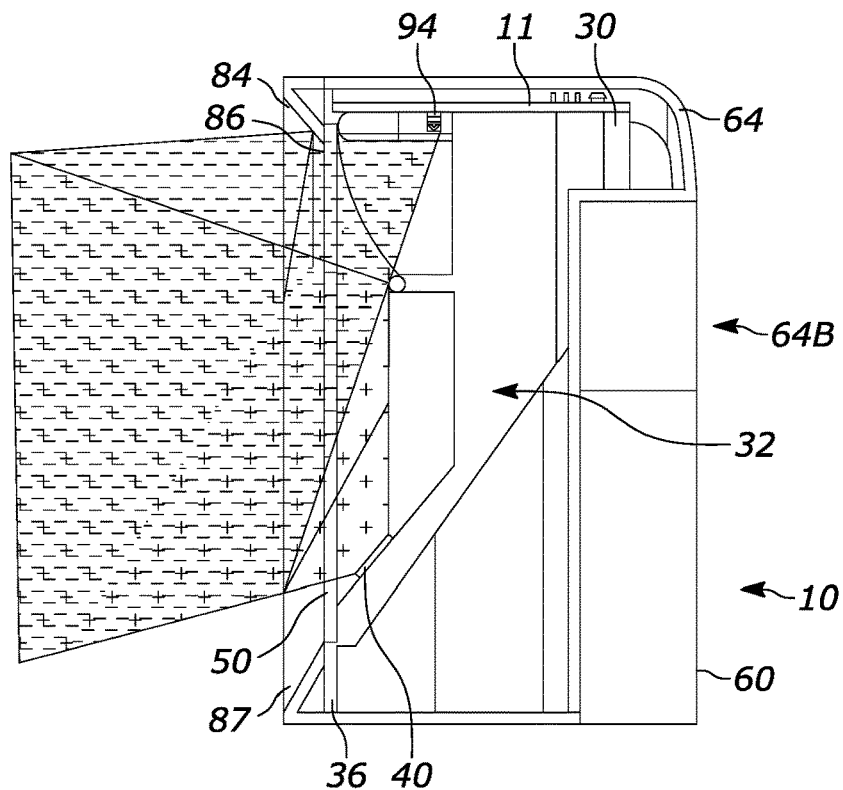
FIG. 11 is a side elevation cross sectional view of the industrial digital barcode reader assembly of FIGS. 1-10 having an offset illumination system in accordance with this disclosure.

With reference to FIG. 11, the illumination member 94 may also be offset and can include a separate illumination compartment 95 of the chassis 30 used to provide separation between it and the imaging assembly 12. The offset illumination compartment 95 may advantageously allow use of a parallel window 50 that is flush or nearly flush with the first end 64a of the exterior surface 64 of the housing 60, thereby allowing the scanner assembly 10 to be used in horizontal and kiosk configurations.

In some examples, a FOV tilt of 10.6° downward relative to a vertical axis may be adequate to read as little as 11.7 mil at 3" for a perpendicular barcode, 8 mil at 3" when the barcode is tilted (e.g., approximately 15°) towards the scanner, and 8.7 mil at 1" for a perpendicular barcode. This ensures that the horizontal slot scanner can read 60% UPC and lower densities and still have a tall enough FOV for the vertical slot scanner.

In these and other examples, illumination can be achieved in a number of ways: by using a lens in front of the LED to distribute the light evenly, or by tilting a separate illumination PCB at the angle above. In some examples, the LED may have a 70% intensity over the required 60°.

So configured, the scanner assembly 10 may be lower cost due to the use of shared parts and can easily be functionally adaptable as needed. By using a single scanner assembly for multiple orientations, a total number of product configurations may be reduced. The scanner assembly can be easily implemented in kiosks and self-checkout counters, and can easily be reused in stores even if they wish to change the type of scanner they are using. Further, by using a shared window for both configurations, the scanner assembly is more easily convertible and will maintain the seal for the optical cavity even if the configuration is switched. The shared window is the only window for vertical orientations, and is retained by the front bezel (which may be snapped on). The shared window becomes the inner window when using the scanner assembly in the horizontal configuration.

Further still, the user interface elements are usable in each configuration. By placing the indicator lightpipe behind the first window, visibility is ensured regardless of configuration of the scanner assembly. By making all of the interface elements accessible from the front face of the convertible unit, they may be accessible in any orientation thereof. Additionally, stores that store spare electronic equipment to replace out of service units will no longer need to keep as many spares available if they use more than one type of slot scanner in their retail environment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A convertible slot scanner assembly for capturing at least one image of an object appearing in a field of view (FOV), the convertible slot scanner assembly comprising:

an imaging assembly configured to capture an image frame appearing in the FOV;

a controller in communication with the imaging assembly to control operation thereof;

an image decoder in communication with the imaging assembly and the controller, the image decoder configured to receive the image frame and decode a barcode captured in image data captured by the imaging assembly;

a chassis configured to accommodate the imaging assembly, the chassis including an optical cavity, an opening, and a flange portion at least partially surrounding the opening;

a first window configured to at least partially cover the opening of the chassis; and a housing including a housing cavity dimensioned to at least partially accommodate the chassis;

wherein the housing is positionable in a first, horizontal configuration whereby the first window is in a generally horizontal orientation and a second, vertical configuration whereby the first window is in a generally upright orientation.

2. The convertible slot scanner assembly of claim 1, further comprising a first adapter configured to be coupled with the chassis when the housing is positioned in the horizontal configuration.

3. The convertible slot scanner assembly of claim 2, wherein the first adapter comprises:

a platter including a platter opening; and a second window configured to at least partially cover the platter opening.

4. The convertible slot scanner assembly of claim 3, wherein the first adapter further comprises a tub configured to engage at least one of the housing or the flange portion of the chassis, wherein the platter is configured to engage at least one of the tub or the flange portion of the chassis.

5. The convertible slot scanner assembly of claim 1, further comprising a second adapter configured to be coupled with the chassis when the housing is positioned in the vertical configuration.

6. The convertible slot scanner assembly of claim 5, wherein the second adapter comprises an outer bezel configured to engage at least one of the housing or the flange portion of the chassis.

7. The convertible slot scanner assembly of claim 6, wherein the outer bezel protrudes outwardly from the first window to form a recessed region.

8. The convertible slot scanner assembly of claim 1, further comprising at least one interface element.

9. The convertible slot scanner assembly of claim 8, wherein the at least one interface element comprises at least one of at least one button, an illumination member, or a sound generating device.

10. The convertible slot scanner assembly of claim 8, wherein the at least one interface element is at least one of physically engagable, viewable, or audible from an outwardly facing side of the housing.

11. The convertible slot scanner assembly of claim 8, wherein the at least one interface element comprises the sound generating device, wherein the flange portion of the chassis further includes at least one sound port.

12. The convertible slot scanner assembly of claim 8, wherein the at least one interface element comprises the at least one button, the at least one button being engageable through the flange portion of the chassis.

13. The convertible slot scanner assembly of claim 8, wherein the at least one interface element comprises the illumination member, wherein the illumination member is viewable through the first window.

14. The convertible slot scanner assembly of claim 1, wherein the first window sealingly engages the optical cavity.

15. The convertible slot scanner assembly of claim 1, wherein the flange portion of the chassis includes at least one mounting mechanism.

16. The convertible slot scanner assembly of claim 1, wherein the chassis further comprises a mirror support member.

17. The convertible slot scanner assembly of claim 16, wherein the mirror support member includes a plurality of support surfaces to accommodate a mirror in a plurality of positions.

18. The convertible slot scanner assembly of claim 1, wherein the chassis further includes an illumination cavity positioned a distance from the optical cavity.

19. The convertible slot scanner assembly of claim 1, wherein the FOV is arranged non-perpendicularly relative to the first window.

20. A convertible slot scanner assembly for capturing at least one image of an object appearing in a field of view (FOV), the convertible slot scanner assembly comprising:

a controller in communication with the imaging assembly to control operation thereof;

an image decoder in communication with the imaging assembly and the controller, the image decoder configured to receive the image frame and decode a barcode captured in image data captured by the imaging assembly a chassis configured to accommodate the imaging assembly, the chassis including an optical cavity, an opening and a flange portion at least partially surrounding the opening;

a first window configured to at least partially cover the opening of the chassis;

a housing including a housing cavity dimensioned to at least partially accommodate the chassis, the housing being positionable in a first, horizontal configuration whereby the first window is in a generally horizontal orientation and a second, vertical configuration whereby the first window is in a generally upright orientation;

a first adapter configured to be coupled with the chassis when the housing is positioned in the horizontal configuration; and a second adapter configured to be coupled with the chassis when the housing is positioned in the upright configuration.

21. The convertible slot scanner assembly of claim 20, wherein the first adapter comprises:

a platter including a platter opening; and a second window configured to at least partially cover the platter opening.

22. The convertible slot scanner assembly of claim 21, wherein the first adapter further comprises a tub configured to engage the flange portion of the chassis, wherein the platter is configured to engage at least one of the tub or the flange portion of the chassis.

23. The convertible slot scanner assembly of claim 20, wherein the second adapter comprises an outer bezel configured to engage at least one of the housing or the flange portion of the chassis.

24. The convertible slot scanner assembly of claim 23, wherein the outer bezel protrudes outwardly from the first window to form a recessed region.

25. The convertible slot scanner assembly of claim 20, further comprising at least one interface element.

26. The convertible slot scanner assembly of claim 25, wherein the at least one interface element comprises at least one of at least one button, an illumination member, or a sound generating device.

27. The convertible slot scanner assembly of claim 25, wherein the at least one interface element is at least one of physically engagable, viewable, or audible from an outwardly facing side of the housing.

28. The convertible slot scanner assembly of claim 25, wherein the at least one interface element comprises the sound generating device, wherein the flange portion of the chassis further includes at least one sound port.

29. The convertible slot scanner assembly of claim 25, wherein the at least one interface element comprises the at least one button, the at least one button being engageable through the flange portion of the chassis.

30. The convertible slot scanner assembly of claim 25, wherein the at least one interface element comprises the illumination member, wherein the illumination member is viewable through the first window.

31. The convertible slot scanner assembly of claim 20, wherein the first window sealingly engages the optical cavity.

32. The convertible slot scanner assembly of claim 20, wherein the flange portion of the chassis includes at least one mounting mechanism.

33. The convertible slot scanner assembly of claim 20, wherein the chassis further comprises a mirror support member.

34. The convertible slot scanner assembly of claim 33, wherein the mirror support member includes a plurality of support surfaces to accommodate a mirror in a plurality of positions.

35. The convertible slot scanner assembly of claim 20, wherein the chassis further includes an illumination cavity positioned a distance from the optical cavity.

36. The convertible slot scanner assembly of claim 20, wherein the FOV is arranged non-perpendicularly relative to the first window.

* * * * *